Feb. 18, 1930.  H. W. TITGEN  1,747,884
COMBINED SAND BLAST EQUIPMENT
Filed Oct. 11, 1926    7 Sheets-Sheet 4

Inventor:-
Harry W. Titgen,
by his Attorneys
Howson & Howson

Feb. 18, 1930.	H W. TITGEN	1,747,884
COMBINED SAND BLAST EQUIPMENT
Filed Oct. 11, 1926	7 Sheets-Sheet 5

Inventor,
Harry W. Titgen
by his Attorneys
Howson & Howson

Feb. 18, 1930. H. W. TITGEN 1,747,884
COMBINED SAND BLAST EQUIPMENT
Filed Oct. 11, 1926 7 Sheets-Sheet 6
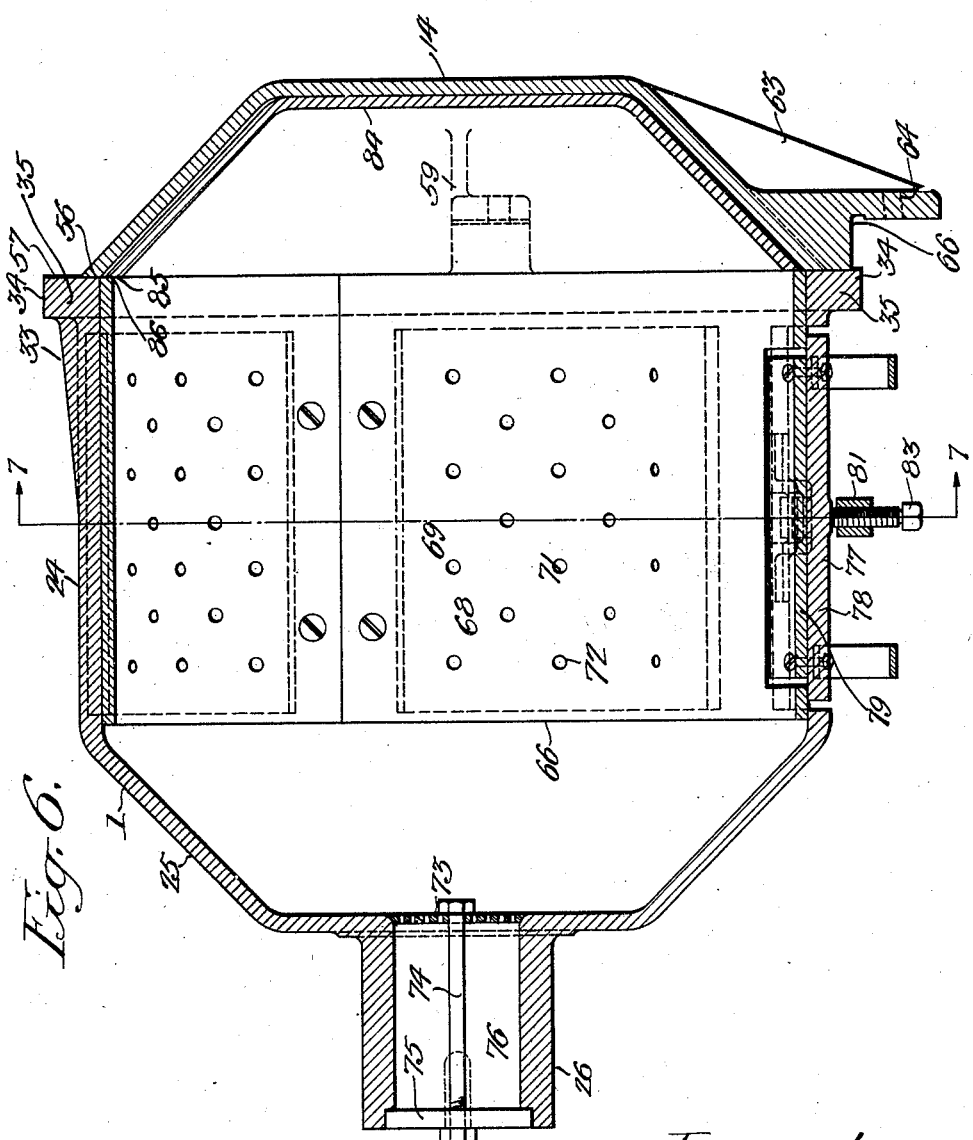

Feb. 18, 1930. H. W. TITGEN 1,747,884
COMBINED SAND BLAST EQUIPMENT
Filed Oct. 11, 1926 7 Sheets-Sheet 7
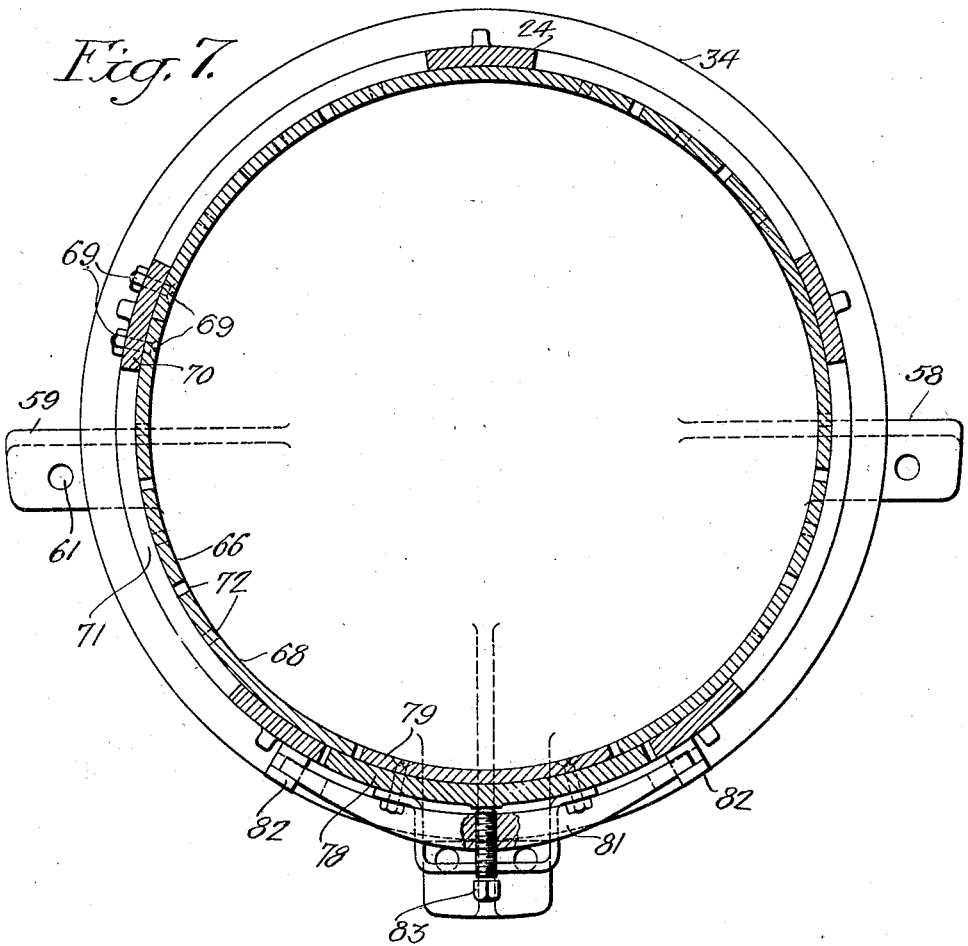

Patented Feb. 18, 1930

1,747,884

UNITED STATES PATENT OFFICE

HARRY W. TITGEN, OF GLENSIDE, PENNSYLVANIA

COMBINED SAND-BLAST EQUIPMENT

Application filed October 11, 1926. Serial No. 140,896.

My invention relates to sand blast apparatus, and it has for one object the provision of a simple and compact sand-blast unit of inexpensive design that shall be particularly adapted to the needs of the relatively small manufacturer.

Another object of my invention is to provide a sand-blast unit comprising a sand-blast barrel designed for one class of work, a sand-blast table adapted to another class of work, means including a discharge nozzle, whereby the used sand may be again discharged onto said table or into said barrel, and a dust collector for removing dust from the space immediately surrounding the barrel and the table.

A further object of my invention is to provide a structure involving a sand-blast barrel, a sand-blast table, hopper sections for said barrel and said table, and a screen forming in connection with the walls of one of said hopper sections a discharge chute for the articles removed from the sand-blast barrel.

A still further object of my invention is to provide a sand-blast barrel, wherein one head is so removably positioned that an inner shell of the barrel may be readily replaced without disturbing the remaining portions of said barrel and supporting bearings.

With these and other objects and applications in mind, my invention further consists in the details of construction and operation and arrangement, hereinafter described and claimed and illustrated in the accompanying drawings, wherein Fig. 1 is a side elevational view of a sand-blast unit embodying my invention;

Figure 3:
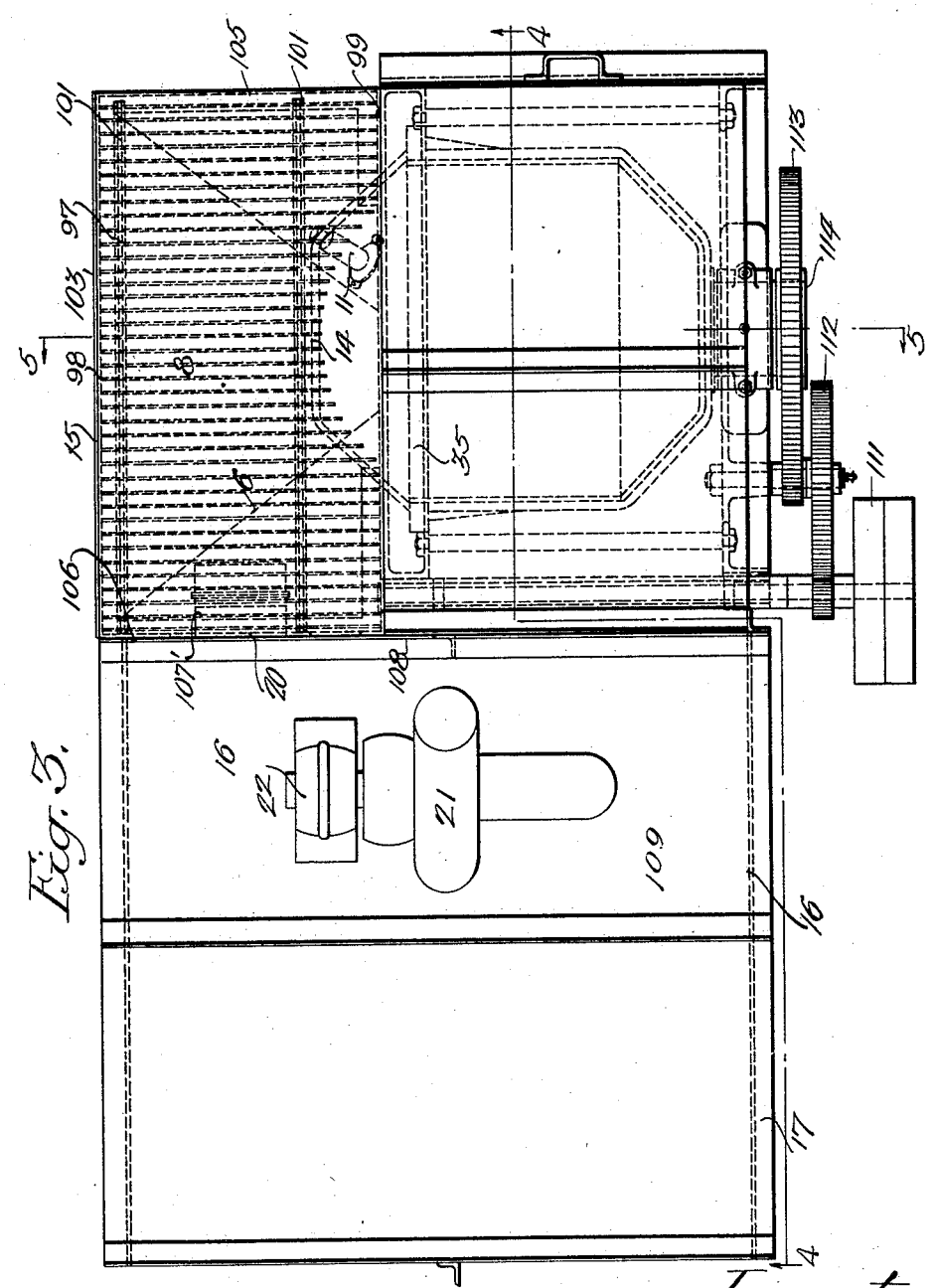
Fig. 3 is a plan view of the structure of Fig. 1.
Figure 4:
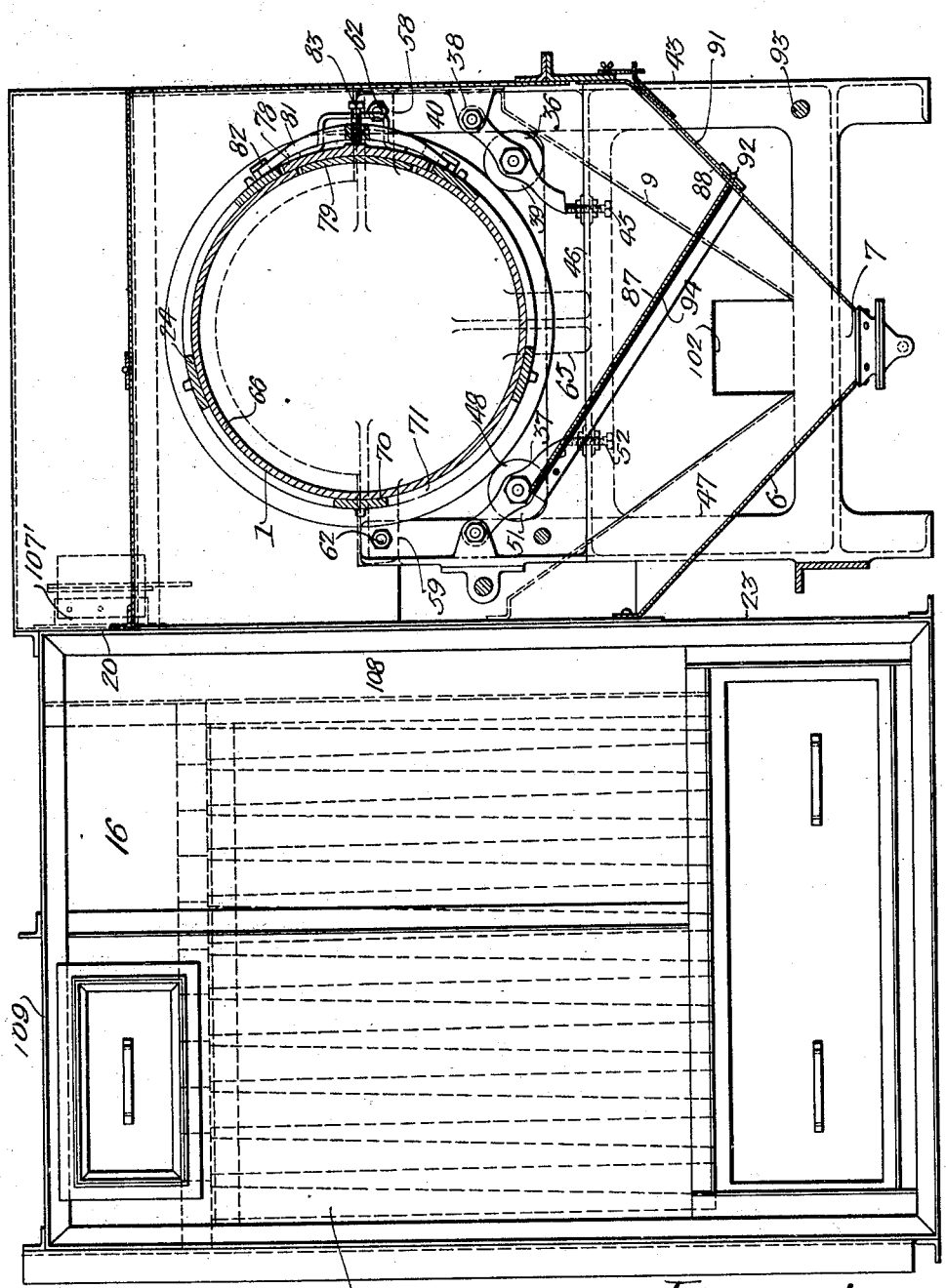
Figure 5:
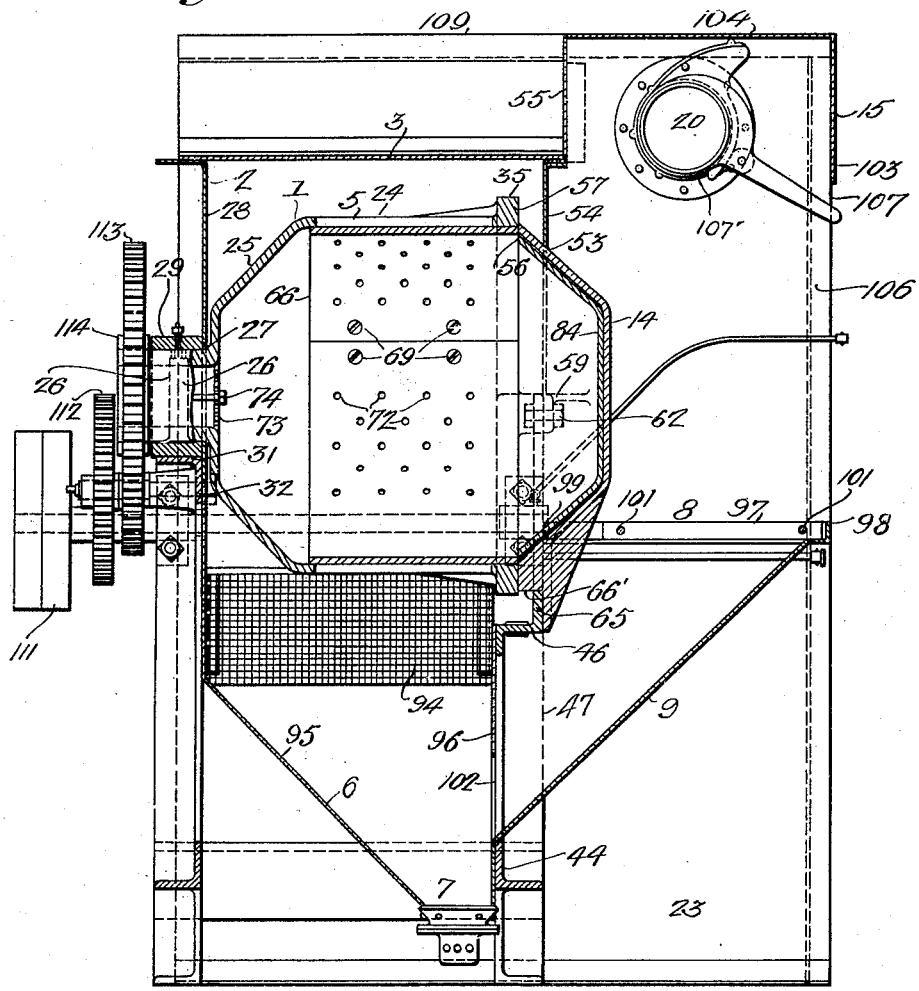

Figs. 4 and 5 are vertical sectional views taken on line 4—4 and 5—5 of Fig. 3;

Fig. 6 is a longitudinal sectional view of the sand blast barrels, and

Fig. 7 is a transverse sectional view taken on the line 7—7 of Fig. 6.

Referring to the drawings broadly, horizontally rotatable tumbling or sand-blast barrel 1 is enclosed by a casing 2 having a door 3 affording access to a side 4 and top 5 of the barrel 1, the casing also having a hopper section 6 terminating in a discharge outlet 7. A grate structure 8 constituting a sand-blast table, is positioned immediately adjacent to the sand-blast barrel 1, and it is designed for castings, forgings or other parts which by reason of their shape or size require blasting by hand rather than in the barrel 1. The used sand from the grate structure 8 is conveyed by a hopper section 9 to the hopper section 6. A discharge nozzle 11 is supplied with sand through a hose 12 leading to the hopper outlet 7, and it may be removably positioned in a nozzle support 13, carried by a stationary head 14 of the barrel 1, whereby sand may be discharged into the interior of the barrel 1 or onto forgings placed on the grate structure 8. The grate structure 8 may be enclosed to a desired extent by a casing 15. The dust incident to the operation of the barrel 1 or the grate structure 8 may be removed by means of a dust collector 16 having an enclosing casing 17, at least one wall 18 of which is common to the barrel and sand-blast casings 2 and 15 respectively. The common wall 18 is provided with suction openings 19 and 20 respectively in communication with the casings 2 and 15. A suction may be created in the dust collector 16 by a fan 21 having a driving motor 22. It will be noted that certain of the foregoing parts are rigidly interconnected to define a single supporting structure 23.

Considering the tumbling barrel 1 in greater detail, as shown in Figs. 6 and 7, an intermediate cylindrical portion 24 is extended at a rear end by a frusto-conical head portion 25 having a hollow trunnion 26 projecting through an opening 27 in a rear vertical side wall 28 of the casing 2. The barrel is horizontally supported at this end by a bearing 29 for the trunnion 26. The bearing 29 is mounted on an upper horizontal flange 31 of a rear frame section 32 of the combined supporting structure 23.

Figure 1:
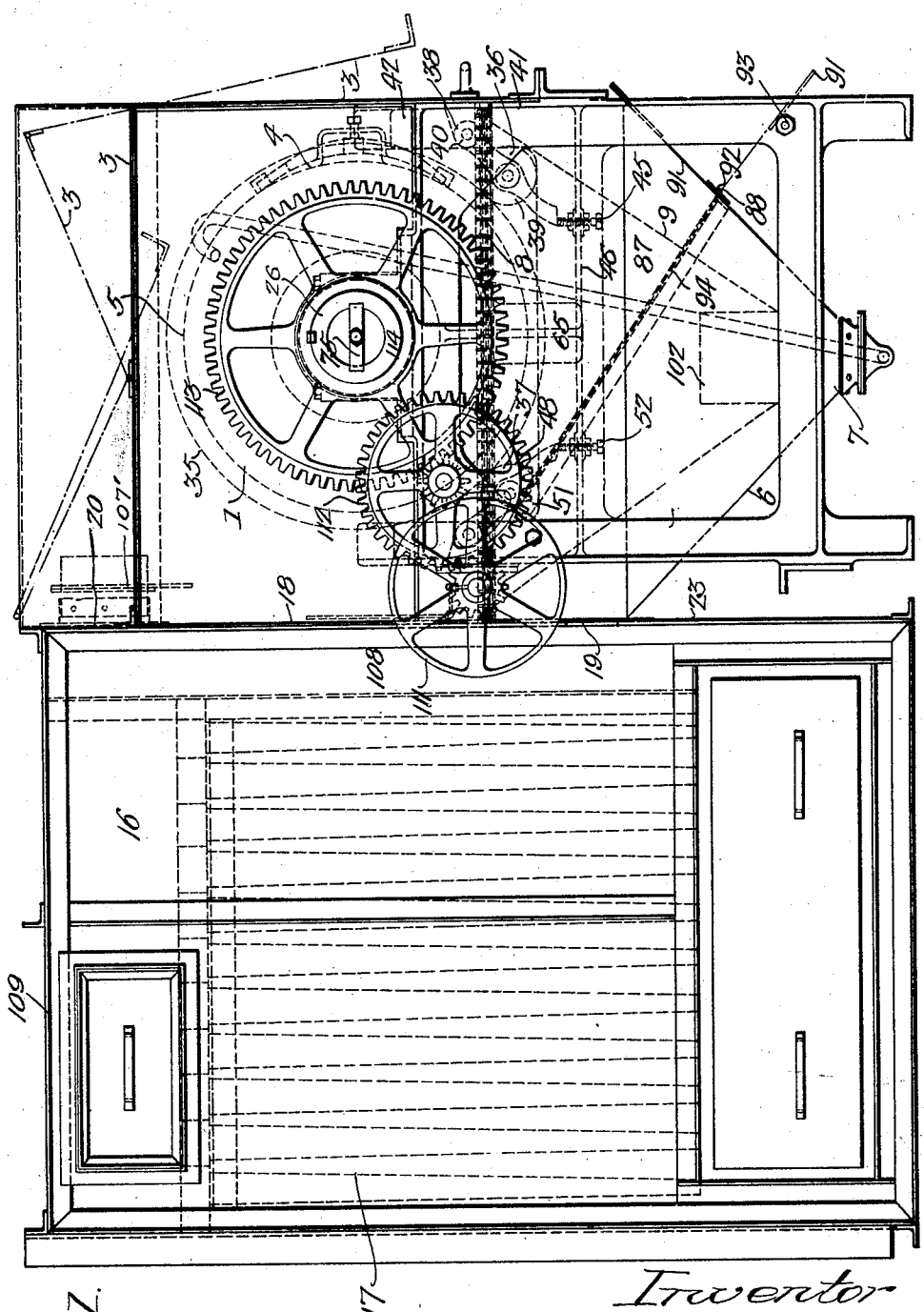
Figure 2:
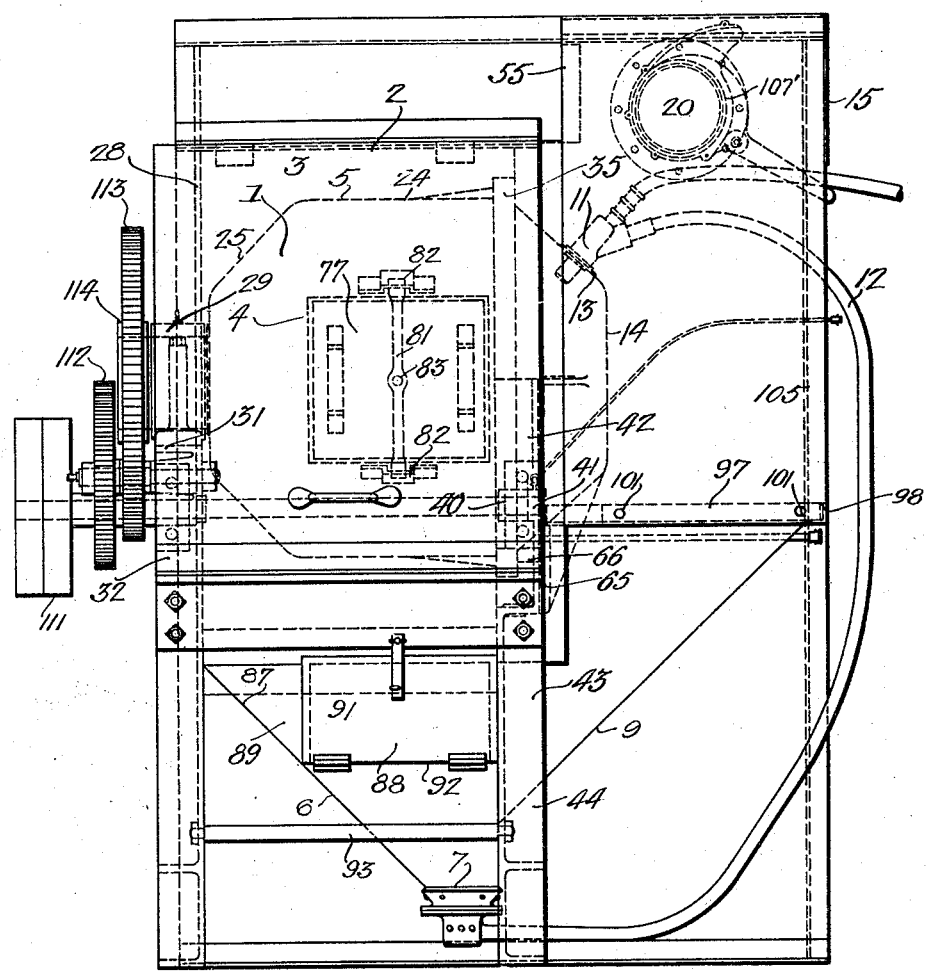
Fig. 2 is an end elevational view of the structure of Fig. 1, looking from the right.

A front end 33 of the intermediate body portion 24 is provided with an annular flange 34 forming a tire 35 which is rotatably supported by a pair of adjustable anti-friction devices 36 and 37. The device 36, of which Fig. 1 is a side elevational view, comprises a yoke member 38 having a roller 39 positioned intermediate the ends thereof. An upper end of the yoke and member 38 is pivotally mounted intermediate spaced flanges 40 and 41, which are formed on an upper end 42 of an angle portion 43 of a front frame section 44. Adjustment of the roller 39 relative to the tire 35 may be effected by means of a set screw 45 extending upwardly through a web 46 which serves to connect the angle portion 43 and a second angle portion 47 of the front frame section 44.

The adjustable supporting device 37 is similar in all respects to the device 38 just described, comprising a roller 48 positioned to engage a portion of the tire 35 opposite to that engaged by the roller 49, and a supporting yoke 51. The yoke 51 has an upper end pivotally mounted on the angle portion 47, while a lower end engages an adjustable abutment afforded by a set screw 52 which extends upwardly through the web 46. The set screws 45 and 52 thus permit an accurate adjustment of the portions 24, 25 and 26 of the tumbling barrel just described.

The front end of the sand-blast barrel 1 is extended by means of the relatively stationary head portion 14 through an opening 53 in a vertical front wall 54 of the casing 2. The front wall 54, which is parallel to the rear side wall 28, constitutes one section of a rear side wall 55 of the grate-structure casing 15. The front head portion 14, which is of frusto-conical form, as in the case of the rear head 25, may be secured with a rear edge 56 forming the base of the cone in sliding engagement with a front side 57 of the annular flange 34 by means of oppositely extending horizontal brackets 58 and 59 having apertures 61 for the reception of clamping bolts 62 extending from the angle portions 43 and 47 of the front frame section 44.

The head 14 may be further detachably secured in position by means of a downwardly extending bracket 63 having apertures 64 for the reception of bolts extending from a vertical flange 65 constituting an extension of the web 46. The bracket 63 is also provided with a horizontal shoulder 66' adapted to rest on the upper edge of the flange 65. The head 14 is thus supported at three points by the brackets 58, 59 and 63 in such manner that it may be readily removed and replaced without in any way disturbing the remaining portions 24, 25 and 26 of the tumbling barrel or their associated bearings. Such removal of the head is especially advantageous when access is required to the interior of the tumbling barrel 1.

Heretofore it has been necessary to discard the tumbling barrel when the inner surface thereof becomes worn, with the result that tumbling barrels were expensive to operate. Moreover, the removal of the barrel itself represented an expensive operation since it was necessary to remove a considerable portion of the connected parts. As above-noted, these undesirable results are overcome in my invention by the provision of a removable liner 66 in at least the cylindrical portion 24 of the barrel, and the mounting of the barrel as a whole so that it is only necessary to remove the head 14 in order to replace the liner 66.

The liner 66, which forms a principal working chamber 67 may comprise a plurality of sections 68, which are secured in abutting relation by bolts 69 and nuts 69', the former extending into strap sections of the body portion 24. Openings 71 are formed in the portion 24 intermediate successive strap sections 70, whereby sand and dust may pass from the tumbling barrel 1 through apertures 72 in the liner 66. A flow of air may be assured to the interior of the barrel 1 through the hollow trunnion 26. The passage provided by the trunnion 26 may be partially closed by an apertured plate 73 to prevent the articles under treatment from escaping. The plate 73 may be secured in position by means of a bolt 74 and a supporting bar 75 extending between spaced recesses 76 in the walls of the trunnion 26, as illustrated in Figs. 1 and 6.

The articles under treatment may be removed from the sand blast barrel 1 through a door 77 comprising removable sections 78 and 79 of the intermediate cylindrical portion 24 and the inner liner 66 respectively. The door 78 may be removably held in position by means of a clamping dog 81, the ends of which engage abutments 82 by extending from the intermediate body portion 24, and a set-screw 83. The heads 25 and 14 may also be provided with liners, but the latter only is shown provided with a liner 84 conforming to the inner surface thereof and so positioned that an edge 85 slidably engages an adjacent edge 86 of the inner liner 66, forming a tight joint therebetween.

The articles discharged from the tumbling barrel 1, through the door 78 may be conveyed from the casing 2 by an inclined chute 87 leading downwardly to a discharge outlet 88 in a side 89 of the hopper section 6. The outlet 88 may be closed by a door 91 which is so hinged at a lower edge 92 that when the door 91 is opened, it constitutes a continuation of the chute 87. The door 91 may be supported in the open position by means of a frame tie rod 93 which extends between the front and rear frame sections 32 and 44. A bottom wall 94 of the chute 87 may comprise a screen member, the mesh of which is sufficiently large to permit the used sand to pass therethrough to the bottom portion of the hopper section 6 adjacent to the discharge outlet 7. The member 94 extends upwardly underneath the tumbling barrel 1, as shown in Fig. 1, whereby opposite side wall portions 95 and 96 of the hopper section 6 may constitute the side walls of the chute 87.

A further feature of my invention is the grate structure 8 which affords the operator a suitable sand-blast table for forgings and other parts which, by reason of their shape or size, may not be sufficiently cleaned in the barrel 1. The grate structure 8 comprises a plurality of bars 97 which are mounted in spaced relation on a pair of angles 98 and 99 extending horizontally outwardly from the front frame section 44. The bars may be interconnected by rods 101. The grate structure 8 is removably positioned in front of but just below the removable front end 14 of the tumbling barrel 1. It will be noted that the grate structure 8 must be first removed before the head 14 of the barrel 1 may be detached from the barrel 1 sufficiently to permit the replacement of the liner 66. The used sand from the grate structure 8 may be conveyed by the hopper section 9 to an opening 102 in a front side wall of the hopper section 6 positioned between the chute 87 and the discharge outlet 7.

The enclosing casing 15 for the sand-blast table 8 comprises a rear side wall 55, a front side wall 103, a top wall 104 an end wall 105 and a section 106 of the dust collector wall 18. The front wall 103 extends only partly down the side of the casing 15 leaving an opening 107 affording access to the sand-blast table 8. The opening 19 and the opening 20, which is controlled by a valve 107′, establish communication between a suction side 108 of the dust collector 16 and the casings 2 and 15, respectively. A suction may be created in the dust collector 16 by means of the fan 21 and the motor 22 which are mounted on an upper side 109 of the casing 17. The resulting flow of air established through the dust collector 16 causes the dust to be deposited on the suction side 108 thereof and clean air only discharged to atmosphere through the fan 21.

The tumbling barrel may be operated by power from a pulley wheel 111 mounted on the rear frame section 32 and gearing 112, the latter including a gear-wheel 113 which is keyed to an outer portion 114 of the hollow trunnion 26 positioned beyond the rear side wall 28 of the housing 2. Assuming that the sand blast barrel 1 is in operation and the parts in the general solid-line position of Fig. 1, the used sand is discharged from the hopper sections 6 and 8 through the nozzle 11, into the tumbling barrel 1, effecting a cleaning of the castings. This sand then passes through the openings 72 into the hopper section 6, again collecting immediately above the discharge outlet 7. When the castings are cleaned to a desired extent, the door 3 is moved into the extreme collapsed position illustrated in dot-and-dash lines in Fig. 1, thus affording access to the charging door 77. The opening of the latter permits the articles to pass from the sand-blast barrel 1, onto the chute 87 which conveys the same to the discharge opening 88. When the hopper door 92 is moved into the dot-and-dash line position of Fig. 1, the articles are discharged from the hopper section 6 into a receptacle or other receiving means (not shown). The dust incident to the foregoing operation is removed by the suction effect of the fan 21 and deposited in the dust collector 16.

In the event that casings are to be cleaned which require hand treatment, the nozzle 11 is removed from the supporting structure 13 in the barrel 1 and the used sand is discharged onto such work as is placed on the sand-blast table 8. Upon the occurrence of this operation, the valve 107′ is opened so that the dust in the casing 15 may be drawn into the dust collector 16 and deposited therein.

While I have shown only one embodiment of my invention, for the purpose of describing the same and illustrating its principles of construction and operation, it is apparent that various changes and modifications may be made therein without departing from the spirit of my invention and I desire, therefore, that only such limitations shall be imposed thereon as are indicated in the appended claim or demanded by the prior art.

I claim:

A rotary tumbling barrel comprising a cylindrical intermediate portion and head portions, one of said head portions being relatively stationary, a liner positioned in said intermediate portion to define a principal working chamber, said intermediate portion and said liner having openings through which the sand may pass and also provided with a door for the removal of the treated articles, one head portion having angled walls and also a hollow trunnion affording a supply of air to the interior of said barrel, the edge of said intermediate portion adjacent to said stationary head having a flange forming a tire, one side of said flange and said stationary head being in slidable engagement, said last-mentioned head having a liner, the latter and said last-mentioned head being removable relative to said intermediate body portion, whereby said first-mentioned liner may be replaced.

HARRY W. TITGEN.